United States Patent [19]

Dietenberger et al.

[11] Patent Number: 4,753,331
[45] Date of Patent: Jun. 28, 1988

[54] SPRING MECHANISM ON A CLUTCH

[75] Inventors: Josef Dietenberger, Ebersbach; Hubert Lehle, Meckenbeuren, both of Fed. Rep. of Germany

[73] Assignee: Zahnradfabrik Friedrichshafen AG, Friedrichshafen, Fed. Rep. of Germany

[21] Appl. No.: 823,505

[22] PCT Filed: May 4, 1985

[86] PCT No.: PCT/EP85/00199
§ 371 Date: Jan. 16, 1986
§ 102(e) Date: Jan. 16, 1986

[87] PCT Pub. No.: WO85/05423
PCT Pub. Date: Dec. 5, 1985

[30] Foreign Application Priority Data

May 16, 1984 [LU] Luxembourg ...... PCT/EP84/00146

[51] Int. Cl.[4] .............................. F16D 23/12
[52] U.S. Cl. ................. 192/67 R; 192/109 A
[58] Field of Search ............... 192/99 A, 99 S, 99 R, 192/66, 109 A, 67 R

[56] References Cited

U.S. PATENT DOCUMENTS

| 2,786,560 | 3/1957 | Ishoy | 192/109 A |
| 3,277,987 | 10/1966 | Zeidler | 192/99 S |
| 4,303,151 | 12/1981 | Kolacz | 192/114 R |
| 4,348,913 | 9/1982 | Nozawa | 192/109 A |
| 4,352,418 | 10/1982 | Teraoka | 192/67 R |
| 4,408,684 | 10/1983 | Gladich | 192/67 R |
| 4,522,082 | 6/1985 | Musumiya et al. | 192/99 S |

FOREIGN PATENT DOCUMENTS 230424 1/1910 Fed. Rep. of Germany .

Primary Examiner—Carl D. Friedman
Assistant Examiner—Caroline D. Dennison
Attorney, Agent, or Firm—Hayes, Davis & Soloway

[57] ABSTRACT

A spring apparatus for a positive engagement clutch in which a sliding sleeve is forced into and out of locked engagement with a drive shaft by a spring mechanism. The spring mechanism includes a shift fork containing sliding blocks which engages with a peripheral groove on the sliding sleeve, a prestressing lever, and a spring guide. The spring guide interconnects the shift fork and the prestressing lever. The prestressing lever is capable of being locked in an engaged position in which the spring is compressed until the sliding sleeve engages with the drive shaft, and a disengaged position in which the spring is relaxed and a rigid connection occurs.

6 Claims, 2 Drawing Sheets

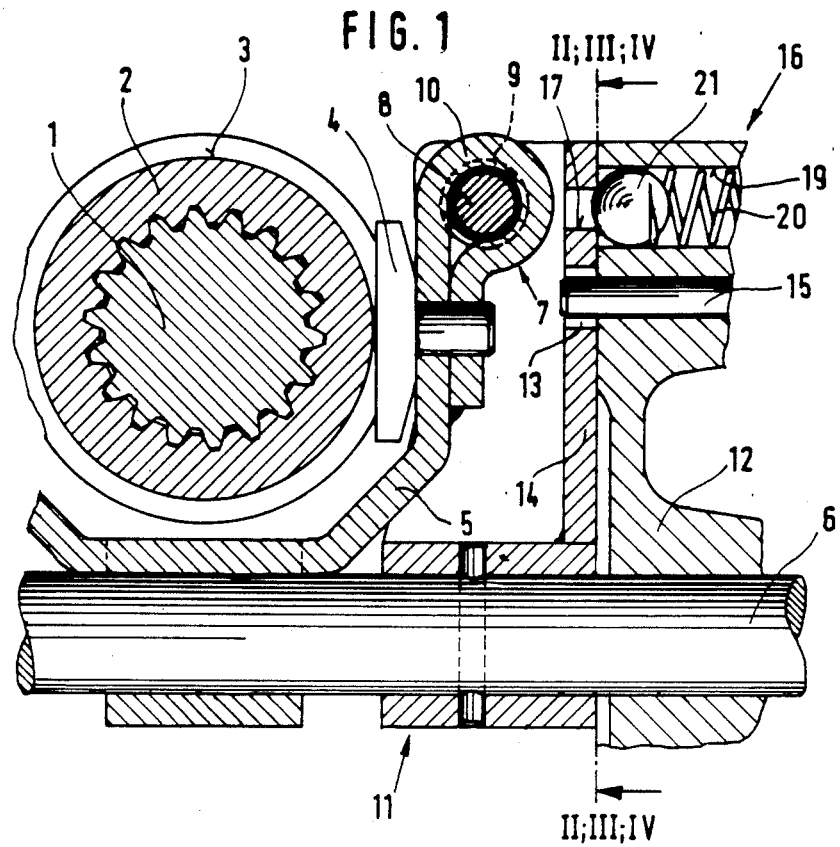
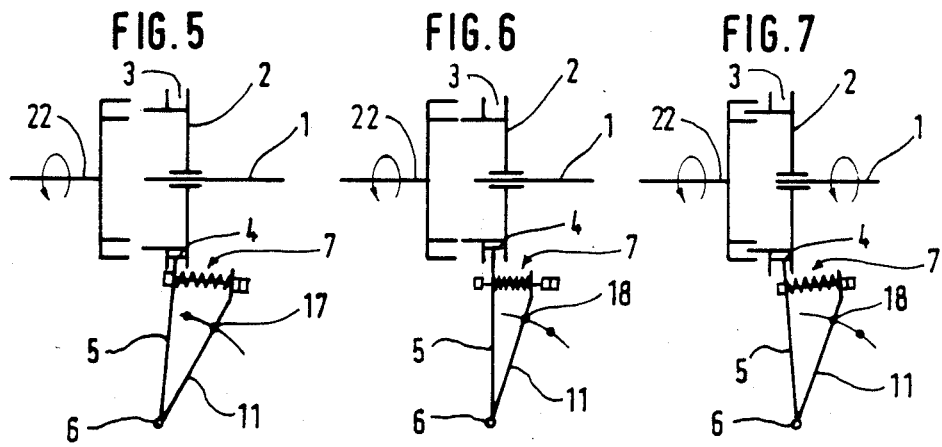

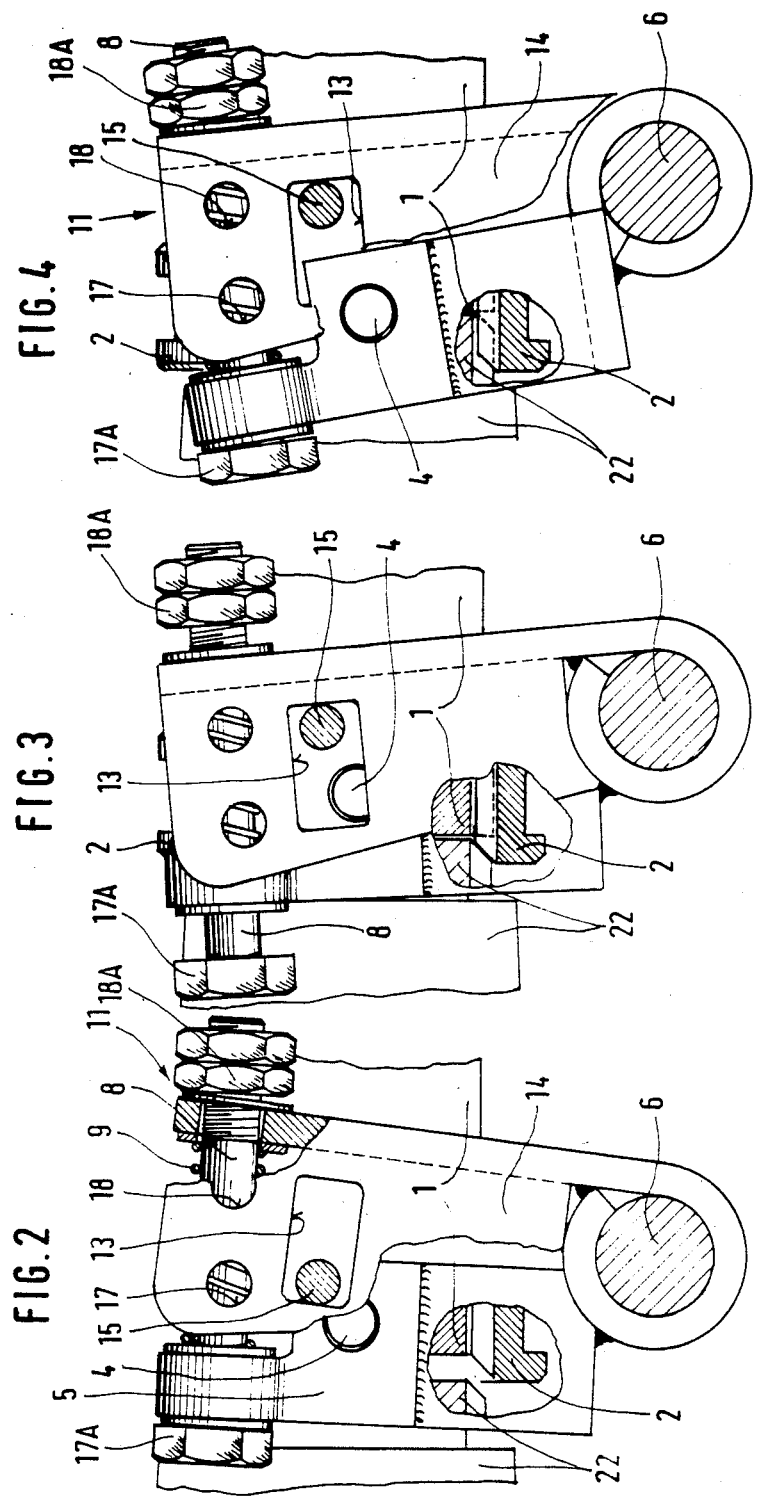

SPRING MECHANISM ON A CLUTCH

The invention is concerned with a spring mechanism for a positive engagement clutch such as it has been disclosed in DE-C No. 29 49 149. In arrangements of this kind, the springs are usually integrated with the sliding sleeve or the shift fork and therefore are not very easily assembled. In another kind of assembly (according to DE-C No. 578 901), the springs are concentrically situated around the main axis of the shaft. In both cases the overall length of the springs adds to the overall axial length of the clutch itself and thus requires more overall length for the respective gearing. Moreover, after the assembly is completed, it is not possible to individually adjust the engaging forces and feed paths by setscrews or the like. The adjusting force in the solutions known already must also be maintained on the pivot shaft until effecting or releasing the engagement. Also direct disengagement (without spring action) is not provided thereby so that the driver is not given a feeling of assurance that complete disengagement has occurred.

The invention is directed to the problem of providing a spring mechanism for positive engagement clutches which can be quickly and easily engaged, simply assembled and readjusted, and with which the axial overall length of the clutch is also less affected and a direct springless disengagement is possible.

The solution of the problem consists in that the springs are now supported outside, on the periphery of the sliding sleeve, between a prestressing lever and a shift fork by a spring guide bolt. The expansion of the spring allows the end portions of a bolt to abut against the external sides of the lever and the fork, but when pressure is exerted by the lever thereby compressing the spring against the shift fork, the pressure is released only when the sliding sleeve is engaged.

Thus any additional axial overall length on the shaft, is prevented and the springs remain outside the heating zone of the sliding sleeve. Assembly and adjustment of the spring mechanism is possible without dismounting the sliding sleeve, and several parts remain unchanged and they can be used with different size sleeves, shifting forces and feed paths. In addition, disengagement is directly possible with a positive connection of prestressing lever and shift fork via the end portions of the bolt. The springs also prevent transmission of vibration from the sliding sleeve to the pivot shaft or vice-versa, and end stops do not need to be situated in the driver's compartment (mostly rubber cushioned) making allowances for other play-causing joints, etc. The spring resistance increases only briefly upon actual engagement of the stop. The shift fork and the prestressing lever can be advantageously manufactured as sheet-metal molded parts at reasonable costs.

The following advantages are obtained.

The spring prestressing in the final positions of the sliding sleeve can be reduced.

The actual actuation periods are limited to those needed for arriving at one of the stop positions.

A kinematically favorable arrangement results from a double use of the pivot shaft or the bearing thereof.

A favorable distribution of force onto the springs is obtained and a double use therefor is achieved.

A lever and stop design favorable to mass production is obtained.

The invention is explained in detail with reference to the following embodiments:

FIG. 1 shows a cross sectional view through the shaft and sliding sleeve, with the spring guides that engage the pivot ends of the shift fork, and the support of the prestressing lever on the pivot shaft of a housing wall.

FIGS. 2, 3 and 4 show in the same sideview, respectively, the prestressing lever and the shift fork behind it, according to the arrangement of FIG. 1, in the possible engaged and disengaged positions in detail and also the design of the prestressing lever and the shift fork constructed of sheet metal which reduces the weight and the expense.

FIGS. 5, 6 and 7 show diagrammatically the three operational states of the spring mechanism according to FIGS. 2, 3 and 4.

In FIG. 1 a positive engagement sliding sleeve 2 that is on the driven shaft 1 is movable in an axial direction by a sliding block 4 located in a peripheral groove 3 of the sliding sleeve 2. The sliding block 4 is rotatably mounted on the pivot end of a shift fork 5, which for its part is pivotably mounted, according to the embodiment, on a pivot shaft 6 that crosses the driven shaft 1. The shift fork 5 can be moved in the direction of rotation about shaft 6, but only via a spring guide 7 having a bolt 8 surrounded by a spring 9. The bolt 8, for this purpose, has its end adjacent the shift fork axially moveable in a bolt guide 10 disposed on the pivot end of the shift fork 5, in the area of the bearing of the sliding block 4, with its opposite end being moveable on the pivot end of a prestressing lever 11. Said prestressing lever 11 is limitedly rotatable or pivotable about the pivot shaft 6 which, according to the embodiment, is mounted to a housing wall 12. The pivot limitations are effected here by a stop pin 15, which starting from the housing wall 12 reaches into a slot 13 of the stem 14 of the prestressing lever 11, and are determined in a manner such that no engagement of the sliding sleeve 2 is possible until a ball detent 16 is engaged with hole 18 in the prestressing lever. According to the embodiment, the detent 16 consists of a ball 21 which is supported in a bore 19 of the housing wall 12 and biased by means of a spring 20 and can be engaged, when the predetermined angle of rotation is reached, in either hole 17 or 18 in the stem 14 of the prestressing lever 11 and which correspond to the respective engaged or disengaged position.

In FIG. 2 the disengaged position of the mechanism is shown according to the invention wherein the separation between the drive shaft 22 and the driven shaft 1 still has not been bridged by the sliding sleeve 22 movable thereon. The prestressing lever 11 is here held by the detent 16 (not shown in FIGS. 2, 3 or 4), in the hole 17 of the stem 14 corresponding to the disengaged position, and the spring 9 of the spring guide 7 is at its maximum extension. As a result of a predetermined residual initial spring tension, it presses the pivot end of the shift fork 5 against a side of the sliding sleeve and, on its opposite side, the pivot end of the prestressing lever 11 against the respective ends 17A or 18A of the bolt 8, thereby both levers 5, 11 being forced apart from one another.

Said levers 5 and 11 are, according to the embodiment, manufactured as sheet-metal molded parts that are lightweight and resistant to bending. The shift fork 5 is mounted as a flat stem across the pivot shaft 6 and has on its pivot end a bolt guide 10 rolled in the manner of a sleeve while the prestressing lever 11 is designed as an angled section having its stem 14 parallel with the axis of the shaft, and isprovided with the holes 17, 18 for engagement with the detent 16 and with the slot 13 into which the stop pin 15 projects. Through the upper end of the other stem of the prestressing lever 11, parallel with the axis of the pivot shaft, the bolt 8 is inserted, which guides or prestresses the spring 9 between the levers 5, 11 and has an effective length easily changeable at the bolt end 18A by lock nuts situated on the stem side remote from the spring for the purpose of adjusting the spring strength and/or length.

FIG. 3 shows the preselected position for the engaged position of the clutch wherein the sliding sleeve 2 still has not been locked into engagement with the drive shaft 22, but is already flexibly pressed in the direction of the drive shaft 22 and against the external splines thereof via the shift fork 5 by the prestressing lever 11 that has been pushed into the engaged position and the spring 9 compressed thereby. The compression of the spring 9, thereby shortens the distance between the levers 5, 11. The spring remains compressed with detent 16 engaging hole 18 and results in a two-sided release of the bolt ends 17A or 18A until the internal splines of the sliding sleeve 2 can mesh with the external splines of the drive shaft 22. Therefore, the driver does not have to keep his hand on the control lever until the sliding sleeve is engaged, for instance, when engaging an additional drive, but can immediately bring the operating hand back to the steering wheel.

In FIG. 4 the engaged position has then been completely reached without changing the detent position, while expansion of the spring 9 has accomplished a locking engagement of the sliding sleeve 2 with the drive shaft 22. The shift fork 5 and the prestressing lever 11 have, at the same time, both fully reached their maximum pivot motion limited by the stop pin 15 in regard to the disengaged position. They now again have substantially the same separation from each other as shown in FIG. 2, but have rotated about the pivot angle of the pivot shaft 6 axially of the drive shaft 22 and the spring 9 is again relaxed to the prestress length predetermined by the bolt 8 and bolt ends 17A, 18A.

The diagrammatic representation shown in FIG. 5 corresponds to the situation described and illustrated in FIG. 2, FIG. 6 logically corresponds in the same manner to the situation of FIG. 3 and FIG. 7 to that of FIG. 4.

In FIG. 6, however, the sliding sleeve 2 is shown as having a reduced diameter, in comparison to FIGS. 5 and 7, to diagramatically depict the abutment of the non-aligned internal and external splines.

With the mechanism according to the invention it is also of special advantage from an operational point of view that, on one hand, the engagement can always be easily and quickly possible with the same actuation resistance but, on the other hand, the return of the sliding sleeve 2 to the disengaged position 18 can be immediately possible, without delay, by a direct springless connection of the pivot lever 6 or prestress lever 11, on one side, and the shift fork 5 on the other via the bolt 8 abutting on both outer sides on the lever 5, 11 upon the disengaged movement (see FIG. 2). Thus, the driver receives absolute certainty that the additional drive is disengaged that is, that the sliding sleeve is positively disengaged. At the same time, the spring is compressed for only a short time during the actual engagement operation and is thus protected against the danger of fatigue.

By virtue of the fact that the lever stops are here directly integrated in the clutch device itself, remote control such as by linkages can be carried out more easily and operate more reliably. The basic principal of the mechanism according to the invention can naturally be accomplished also with a larger number of springs-/or with separate lever-pivot axes or instead of a pivot arrangement of shift fork and prestressing lever, with switching and prestressing elements rationally movable linearly with respect to each other.

We claim:

1. A spring mechanism for a positive engagement clutch having a sliding sleeve (2) with a peripheral groove (3) thereof engaging with a shift fork (5), for bringing a drive shaft (22) and a driven shaft (1) into and out of locked engagement, and having at least one spring (9) situated outside said sliding sleeve (2) between said shift fork (5) and a prestressing lever (11), characterized in that said prestressing lever (11) has a limited axial movable pivot end connected to a pivot end of said shift fork (5) by a bolt (8) and a locking nut surrounded by said spring (9), the bolt (8) and the locking nut provide easy adjustment of a prestressing bias for said spring, a second end of said prestressing lever being pivoted on pivot shaft (6) connected to a housing wall (12) to allow limited axial mobility of the pivot end of said prestressing lever (11), wherein, when said prestressing lever is moved to a drive engaged position said spring (9) initially becomes compressed to bring about clutch engagement and when moved to a drive disengaged position said spring expands and a rigid connection occurs, by means of said bolt (8) and said locking nut, between said prestressing lever (11) and said shift fork (5) to positively disengage the drive and driven shafts.

2. A spring mechanism according to claim 1, characterized in that when in the drive engaged position, said spring (9) is compressed to a minimal length by said prestressing lever (11) against said shift fork (5) until engagement of said sliding sleeve (2) occurs, and said spring (9) expands to a maximum length when in the drive disengaged position and upon engagement of said sliding sleeve (2).

3. A spring mechanism according to claim 1, characterized in that detent means are provided between said prestressing lever (11) and the housing wall (12) for the drive engaged position and the drive disengaged position.

4. A spring mechanism according to claim 1, wherein said pivot shaft (6) is also a pivot axis for said shift fork (5).

5. A spring mechanism according to claim 1, wherein a shift fork (5) and a prestressing lever (11) are provided on each side of said sliding sleeve (2) and respective spring guide bolts (7) are provided for connection therebetween.

6. A spring mechanism according to claim 1, wherein said detent means comprises a stop ball (21) and spring (20) supported in a bore (19) of the housing wall (12) which engage with corresponding holes in a stem (14) of said prestressing lever (11).

* * * * *